(12) United States Patent
Taborek et al.

(10) Patent No.: US 8,925,575 B1
(45) Date of Patent: *Jan. 6, 2015

(54) SYSTEM AND METHOD FOR HARVESTING RAINWATER

(75) Inventors: Joseph W. Taborek, Huntersville, NC (US); Keith Richard Radt, Charlotte, NC (US); Paul Michael Elhardt, Charlotte, NC (US)

(73) Assignee: The Green Rain Barrel Incorporated, Huntersville, NC (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/587,438

(22) Filed: Aug. 16, 2012

Related U.S. Application Data

(63) Continuation-in-part of application No. 12/459,239, filed on Jun. 29, 2009, now Pat. No. 8,397,746, which is a continuation-in-part of application No. 12/384,785, filed on Apr. 9, 2009, now abandoned.

(60) Provisional application No. 61/076,796, filed on Jun. 30, 2008.

(51) Int. Cl.
*F17D 1/13* (2006.01)
*E04D 13/08* (2006.01)
*C02F 1/00* (2006.01)

(52) U.S. Cl.
USPC ........... 137/357; 137/584; 52/16; 210/170.03

(58) Field of Classification Search
USPC .......... 137/236.1, 357, 584, 561 R, 594, 574, 137/576; 52/16; 405/51; 210/170.03
See application file for complete search history.

(56) References Cited

U.S. PATENT DOCUMENTS

| 7,025,879 | B1 * | 4/2006 | Ticknor | 210/232 |
| 8,397,746 | B1 * | 3/2013 | Taborek | 137/357 |
| 2007/0235458 | A1 * | 10/2007 | Hewkin | 220/612 |
| 2009/0114655 | A1 * | 5/2009 | Weatherstone et al. | 220/495.05 |

FOREIGN PATENT DOCUMENTS

JP 2003155761 A * 5/2003 ............... E03B 3/03

OTHER PUBLICATIONS

Flexeel; Plastair SpringJet 50-Foot Coiled Water Hose and Wand Set; Internet Advertisment; published prior to Jun. 30, 2008; 1 page.
Taizhou Huangyan Kaitong Plastic Factory; qx81065 plastic water buckets; published prior to Jun. 30, 2008; 1 page.
Gardener's Supply; Rain Barrels; published prior to Jun. 30, 2008; 1 page.
Kentucky Whiskey Barrel Rain Barrels; http://www.kentuckybarrels.com/RainBarrels.html; Internet Advertisment; published prior to Jun. 30, 2008; 2 pages.

(Continued)

*Primary Examiner* — Atif Chaudry
(74) *Attorney, Agent, or Firm* — Schwartz Law Firm, P.C.

(57) ABSTRACT

A system for rainwater harvesting utilizes a rain barrel adapted for collecting and storing rainwater runoff gravity-fed from a rooftop through a downspout. A downspout diverter comprises an inlet section, an outlet section, and an elongated connector section interconnecting the inlet section and the outlet section. The inlet section has a first open end adapted for communicating with an end of the downspout and a second open end communicating with an inlet opening formed with the rain barrel. The outlet section of the diverter has a first open end communicating with an outlet (or, overflow) opening formed with the rain barrel and a second open end for directing rainwater outwardly from the rain barrel.

18 Claims, 9 Drawing Sheets

(56) References Cited

OTHER PUBLICATIONS

Rain Barrel Guide; "How to use rain barrels for water collection"; http://www.rainbarrelguide.com; Internet Advertisement; Copyright 2004; pp. 1-8.

The Charlotte Observer; "Barrels help users get out of a pickle"; www.charlotte.com; published prior to Jun. 30, 2008; 1 page.

The #1 Quality Rain Barrel—Spruce Creek Rain Saver for Water Conservation; http://www.rainbarrel.net/specs.html; Internet Advertisement; published prior to Jun. 30, 2008; 2 pgs.

Clean Air Gardening; Rain Barrels; http://www.cleanairgardening.com/rainbarrels.html; Internet Advertisment; published prior to Jun. 30, 2008; 2 pages.

Rain Barrel How-To; Rainbarrels, Rain Barrels, Rainfall Calculator: Gardener's Supply; http://www.gardeners.com; Internet Advertisement; published prior to Jun. 30, 2008 1pg.

Super Slim Lightweight Hoses; Gardener's Supply; http://www.gardeners.com; Internet Advertisment; published prior to Jun. 30, 2008; 1 pg.

Plastic-Mart; Liquid Storage and Containment; http://www.plastic-mart.com/class.php?cat=187; Internet Advertisment; published prior to Jun. 30, 2008; 1 pg.

New and Used Kentucky Whiskey Barrels, Wine Barrels, etc.; http://www.kentuckybarrels.com; Kentucky Barrels, LLC; Internet Advertisment; published prior to Jun. 30, 2008; 1 pg.

RainPerfect(TM); Solar Powered Rain Barrel Pump System; Magazine Advertisement; 1-800-SkyMall or www.SkyMall.com; Published prior to Aug. 16, 2012; 1 pg.

Instructions for Installing Rain Barrel; Connecting the spigot to the barrel; Published prior to Aug. 16, 2012; 2 pgs.

Rescue Environmentally Responsible Products; Delux Rain Barrel Rainwater Collection System; Emsco Group; Published prior to Aug. 16, 2012; 1 pg.

Welcome to Noah's Rain Barrel. Maker of high quality rain barrel; "Not all rain barrels are created equal."; Internet Advertisment; http://www.noahsrainbarrel.net; 1 pg.

\* cited by examiner

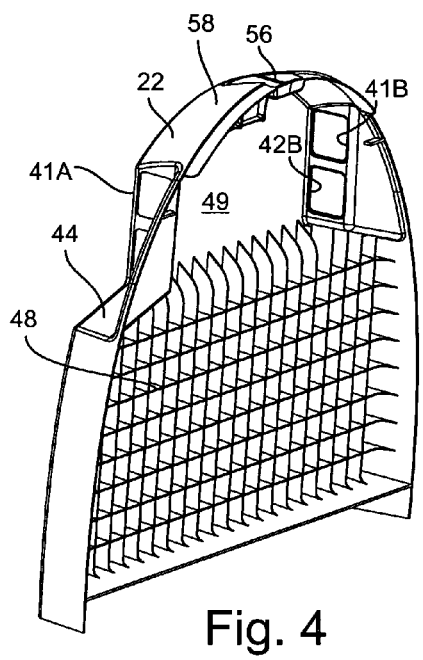 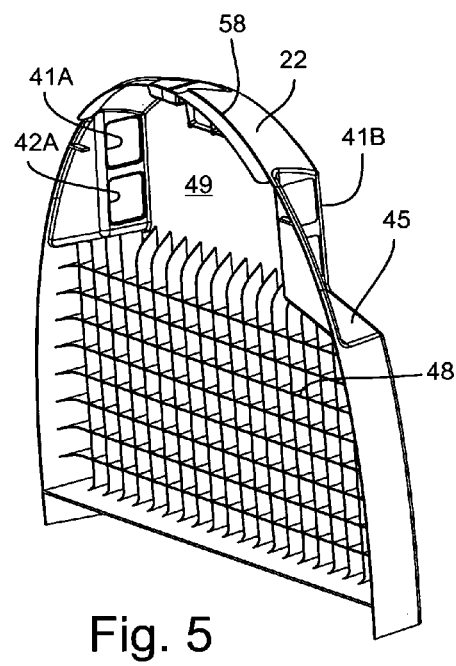
Fig. 4      Fig. 5
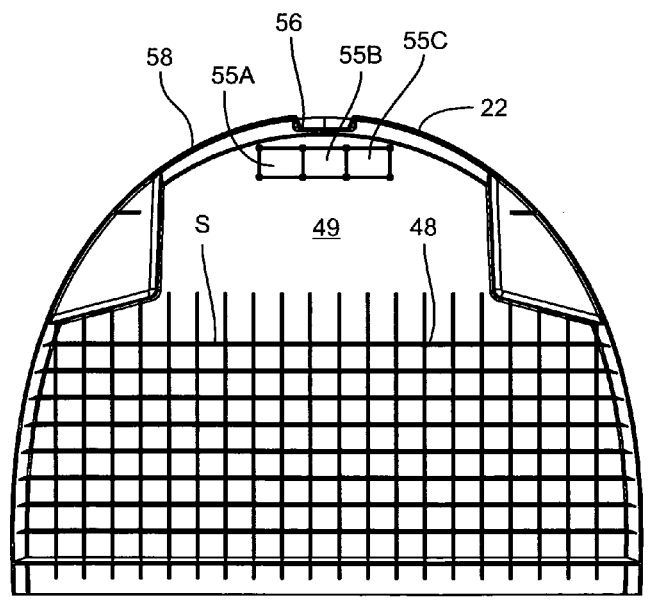
Fig. 6

SYSTEM AND METHOD FOR HARVESTING RAINWATER

TECHNICAL FIELD AND BACKGROUND

The present disclosure relates broadly to a system and method for harvesting rainwater. In one exemplary implementation, the disclosure comprises a do-it-yourself rainwater harvesting system for homeowners which utilizes a downspout diverter and an aesthetically desirable rain barrel. Rainwater harvesting is the gathering, or accumulating and storing, of rainwater. Traditionally, rainwater harvesting has been practiced in areas where water exists in plenty, and has provided drinking water, domestic water, water for livestock, water for irrigation and a way to increase ground water levels.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The exemplary disclosure comprises a system for rainwater harvesting. The system utilizes a rain barrel adapted for collecting and storing rainwater runoff gravity-fed from a rooftop through a downspout. A downspout diverter comprises an inlet section, an outlet section, and an elongated connector section interconnecting the inlet section and the outlet section. The inlet section has a first open end adapted for communicating with an end of the downspout and a second open end communicating with an inlet opening formed with the rain barrel. The outlet section of the diverter has a first open end communicating with an outlet (or, overflow) opening formed with the rain barrel and a second open end for directing rainwater outwardly from the rain barrel.

The term "downspout" refers broadly herein to any pipe or other suitable conduit for conveying rain water from a roof or gutter towards the ground or a drain.

The term "rain barrel" means any above ground or below ground vessel capable of collecting and storing rainwater.

According to another exemplary embodiment, the rain barrel comprises a rounded front and a back. The rounded front comprises an integrally-molded three-dimensional interior grid structure.

According to another exemplary embodiment, the back comprises an integrally-molded three-dimensional interior grid structure.

According to another exemplary embodiment, a mounting base is adapted for carrying the rain barrel, and elevating the rain barrel above a supporting surface.

According to another exemplary embodiment, the rain barrel defines at least one substantially planar exterior surface extending from a bottom of the barrel to a top of the barrel. The bottom of the rain barrel may comprise two spaced apart layers (or floors) which merge together or converge at the front of the rain barrel but are spaced apart (e.g., by 1.0 inch) at the rear of the rain barrel, wherein the upper layer (or floor) acts as the interior bottom of the rain barrel and is sloped toward the front to maximize gravity water flow to the spigot and clean out plug.

According to another exemplary embodiment, the rain barrel defines first and second mirrored inlet openings. The inlet openings are "mirrored" in that they are formed in corresponding locations on opposite sides of the rain barrel.

According to another exemplary embodiment, the rain barrel defines first and second mirrored outlet openings. The outlet openings are "mirrored" in that they are formed in corresponding locations on opposite sides of the rain barrel.

According to another exemplary embodiment, a spigot is operatively connected (directly or indirectly) to the rain barrel and adapted for enabling controlled dispensing of water contained in the rain barrel. In this embodiment, the spigot may be contained within a screw-in plug that is removable presenting an opening that functions as a clean-out/drain, and can be used to flush out unwanted materials carried into the rain barrel by water flowing down the downspout.

According to another exemplary embodiment, the inlet section of the downspout diverter is concavely curved from its first open end to its second open end.

According to another exemplary embodiment, the outlet section of the downspout diverter is convexly curved from its first open end to its second open end.

According to another exemplary embodiment, the connector section of the downspout diverter extends substantially co-linear to the first open end of the inlet section and the second open end of the outlet section. In other words, the first open end of the inlet section, the connector section, and the second open end of the outlet section extend along substantially the same longitudinal axis.

According to another exemplary embodiment, the inlet, outlet, and connector sections are integrally formed together as a single homogenous structure. The language "single homogenous structure" means a unitary structure which is formed together without joints (i.e., without assembly or attachment of multiple separate parts).

BRIEF DESCRIPTION OF THE DRAWINGS

The description of exemplary embodiments proceeds in conjunction with the following drawings, in which:

FIGS. 4, 5, and 6 are views illustrating an inside of the back of the rain barrel;

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
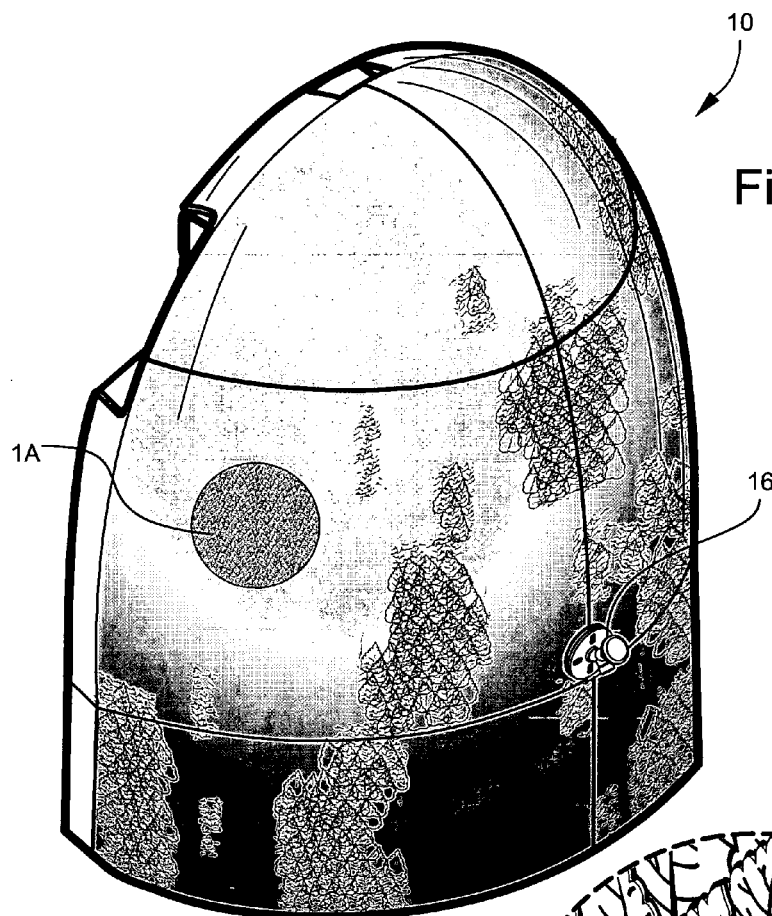
FIG. 1 is a perspective view of an exemplary rain barrel adapted for use in a rainwater harvesting system and method according to one embodiment of the present disclosure.
Figure 1A:
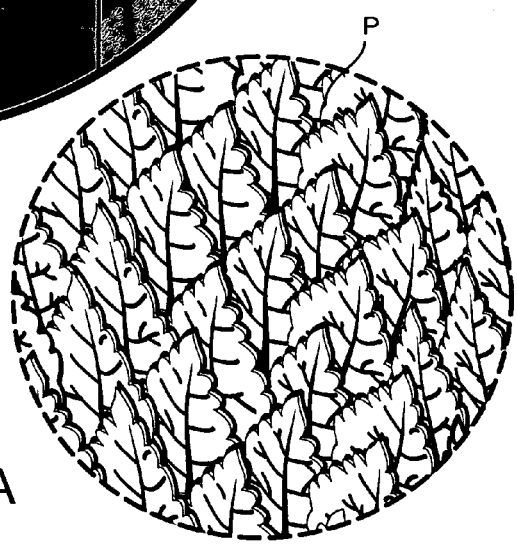
FIG. 1A is an enlarged view detailing a three-dimensional exterior leaf pattern formed with the rain barrel.

Referring now specifically to the drawings, a rain barrel according to one exemplary embodiment of the present invention is illustrated in FIG. 1, and shown generally at reference numeral 10. The exemplary rain barrel 10 is adapted for use in a system and method for harvesting rainwater, as described further herein. The rain barrel 10 has a molded exterior formed of a UV-resistant plastic which is shaped and colored to resemble aesthetically desirable landscaping—small shrubs, bushes, or the like. In the exemplary embodiment, a three-dimensional leaf pattern "P", such as detailed in FIG. 1A, may be formed with the exterior of the rain barrel 10 in shaded regions of FIG. 1.

Figure 2:
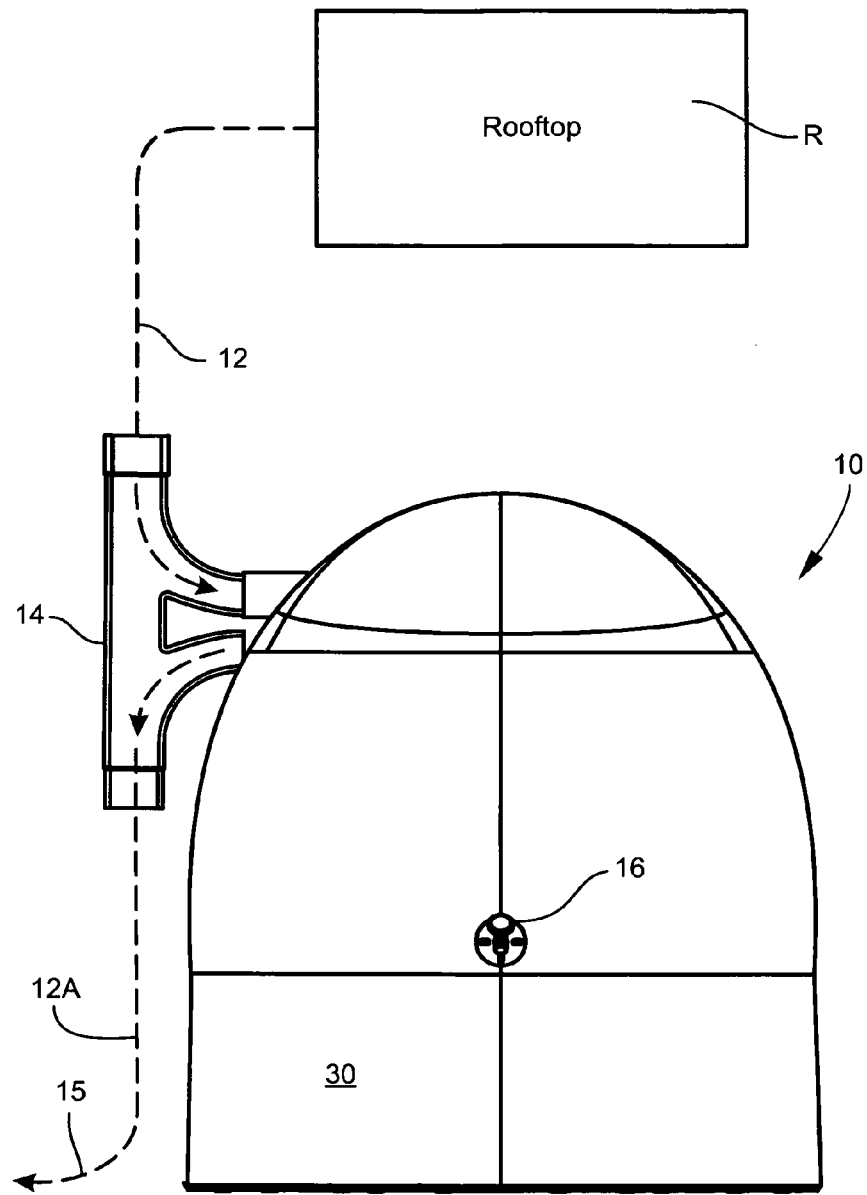
FIG. 2 is a front view of the rain barrel schematically demonstrating attachment and operation of the downspout diverter.
Figure 3:
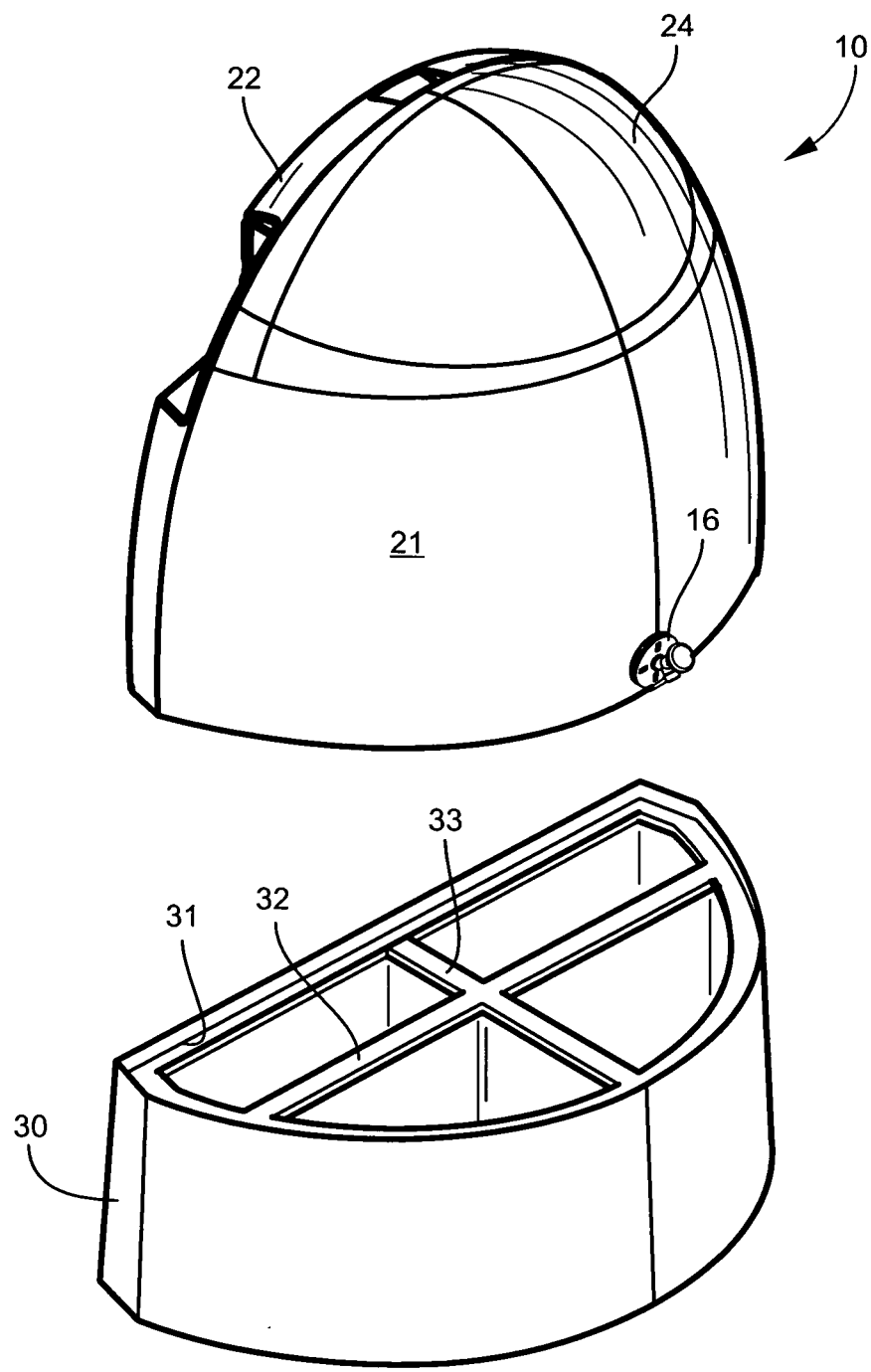
FIG. 3 is a perspective view of the rain barrel and mounting base.

Referring to FIG. 2, the exemplary rain barrel 10 is designed to collect and store rainwater runoff gravity-fed from a building rooftop "R" through an attached (conventional) vertical downspout indicated schematically at 12, and a substantially rigid downspout diverter 14. The downspout diverter 14 fluidly interconnects the existing vertical downspout 12, rain barrel 10, and an optional downspout extension—indicated schematically at 12A. The downspout 12 and downspout extension 12A may have a standard 3"×4" dimension, or may be smaller or larger. As described further below, in one implementation rainwater is gravity-fed from the building rooftop "R" through the vertical downspout 12 and diverter 14, and into the rain barrel 10. When the rain barrel 10 is filled to capacity, excess rainwater is directed outwardly through the diverter 14 and downwardly through downspout extension 12A to the ground surface, as indicated by arrow 15. A back side of the rain barrel 10 (and any supporting structure) may be substantially planar (or flat) to enable close placement directly adjacent a side of the building. The water capacity of the present rain barrel 10 may be 55 gallons or more.

Collected rainwater may be dispensed from the rain barrel 10 in a controlled manner using an operatively attached plastic spigot 16 (or petcock). Watering hoses and wands may also be connected directly to the spigot 16 for convenient landscape watering, and to fill buckets used for transporting water from the rain barrel 10 to various landscaped areas around the building. For more immediate flushing, the rain barrel 10 may include one or more drain openings (not shown). The drain opening may be temporarily sealed by removable connecting structure of the spigot 16, or sealed using a solid-wall plugs and gaskets, or the like.

As best shown in FIGS. 3, 4, 5, 6, 7 and 8, the exemplary rain barrel 10 is constructed of a plastic rounded front 21, generally flat vertical back 22, a forwardly-sloping bottom 23 and top 24. While the plastic top 24 may be removable, the front 21, back 22 and bottom 23 are integrally formed together and water sealed at respective seams (e.g., by ultrasonic welding, heat-welding, mechanical fasteners, adhesives or the like) in order to effectively store rainwater inside the barrel 10. The rain barrel 10 may sit directly on the ground or a slab closely adjacent the building, or may be elevated atop an optional unattached mounting base 30. The mounting base 30, shown in FIG. 3, comprises a raised perimeter flange 31 for locating and retaining the rain barrel 10, and intersecting interior vertical walls 32, 33 integrally-molded together and designed to support the weight of the barrel 10 when filled to its capacity.

Referring to FIGS. 4, 5 and 6, the plastic back 22 of rain barrel 10 defines mirrored pairs of rainwater inlet and transfer (outlet) openings 41A, 42A and 41B, 42B formed within respective opposing insets 44, 45, and an integrally-molded three-dimensional interior grid structure 48 formed with back wall 49. The grid structure 48 reinforces the back 22, and spans more than 50% of the back wall surface area between opposing perimeter side flanges 51, 52 and a horizontal bottom flange 53. The depth of the grid structure 48 (defined as the dimension extending outwardly from the back wall 49) may be in the range of 1-3 inches, while each square "S" may have an approximate dimension of 2-inches×2-inches. The back 22 may also comprise a plurality of rectangular mounting plates 55A, 55B, 55C and 56 (or knock-outs) formed with the back wall 49 and a top flange 58 and above the inlet and transfer openings 41A, 42A, 41B, 42B for receiving accessory devices, such as electronic pump, heater, water level indicator, float switch and other sensors, and the like. In one implementation, an electric rain barrel pump (not shown) with a garden hose fitting is mounted at one of the plates 55A-55C, and used to transfer collected rainwater from the barrel to separate portable water storage tanks.

Figure 7:
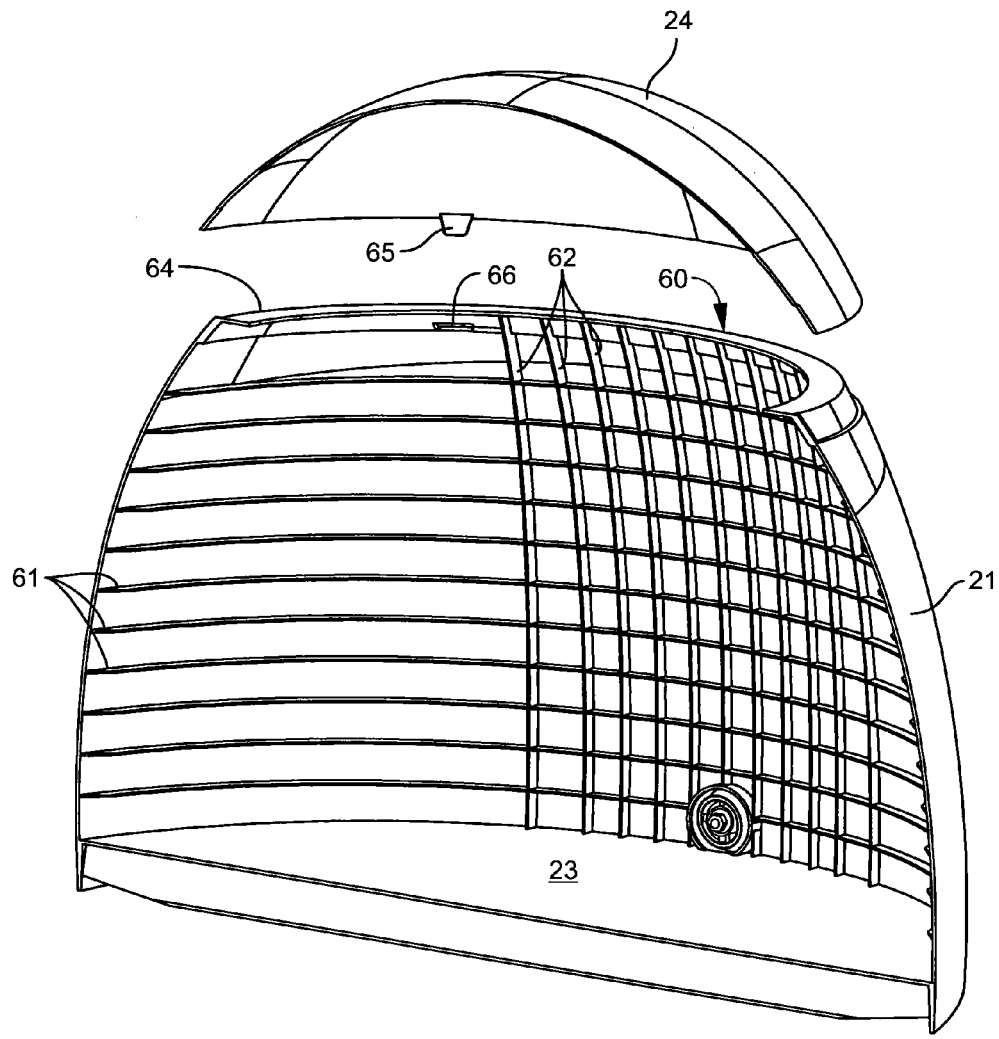
FIGS. 7 and 8 are views illustrating an inside of the front and top of the rain barrel.
Figure 8:
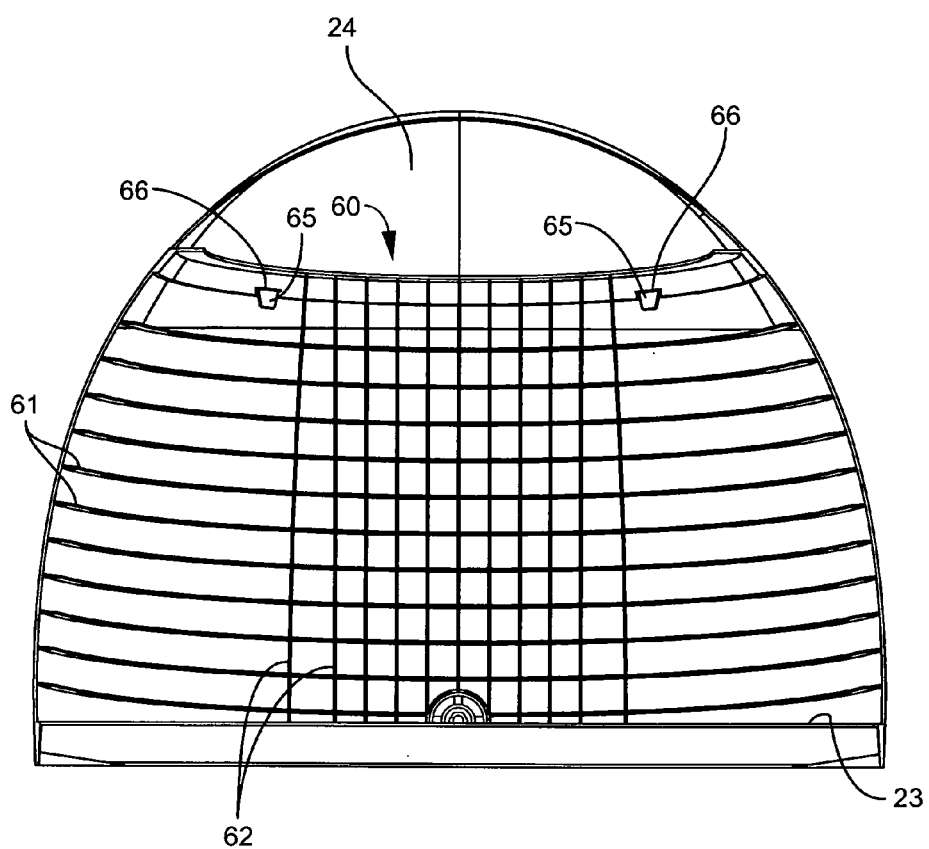

The rounded front 21 and forwardly-sloping bottom 23 of the exemplary rain barrel 10 may be integrally-molded together, as shown in FIGS. 7 and 8, or formed separately and sealed at the seam as previously described. The front 21 is reinforced by an integrally-molded three-dimensional interior grid structure 60 comprising longitudinally spaced arcuate horizontal ribs 61 and intersecting vertical columns 62. The vertical columns 62 extend substantially from the top end of the front 21 to the bottom 23, and are formed within roughly a center third of the front's interior surface area. The horizontal arcuate ribs 61 extend continuously from one side of the front 21 to the other, and are spaced apart approximately 1-2 inches from the bottom 23 to the top end of front 21. The depth (defined as the dimension extending outwardly from the front's interior surface area) of the ribs 61 and columns 62 may be in the range of 0.5 to 1.0 inches. The plastic top 24 of the rain barrel 10 may be removably attached to an arcuate top flange 64 of the front 21 by mating tabs 65 and slots 66.

As indicated above with reference to FIG. 2, the downspout diverter 14 fluidly interconnects the existing vertical downspout 12 of the building, the rain barrel 10, and an optional downspout extension 12A. The exemplary diverter 14, best shown in FIGS. 2, 9, and 10, comprises an arcuate inlet section 14A, an oppositely-curved outlet section 14B, and an elongated connector section 14C. The diverter sections 14A-14C may be integrally formed together (e.g., molded) as a single homogenous structure, and formed in substantially the same vertical plane such that the downspout diverter 14 is reversible for use on either side of the rain barrel 10, as described further below.

Figure 9:
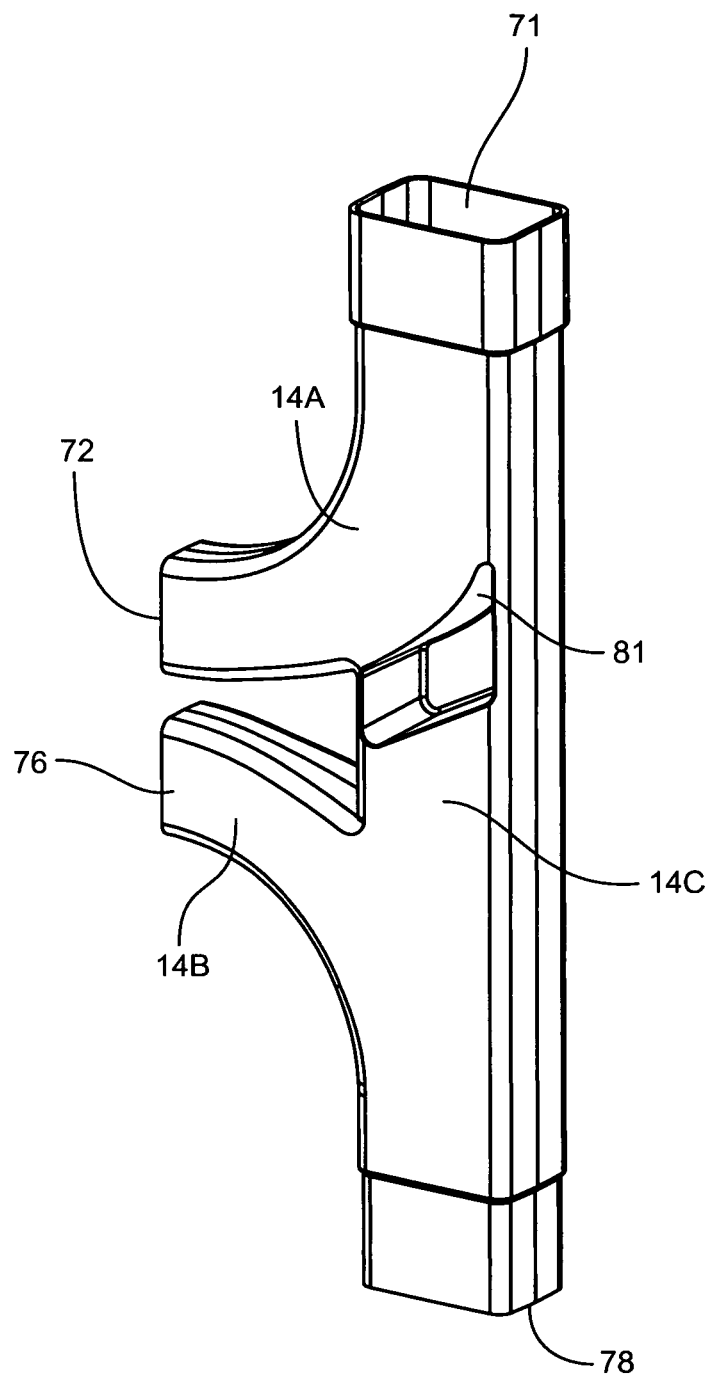
FIG. 9 is a perspective view of the downspout diverter.
Figure 10:
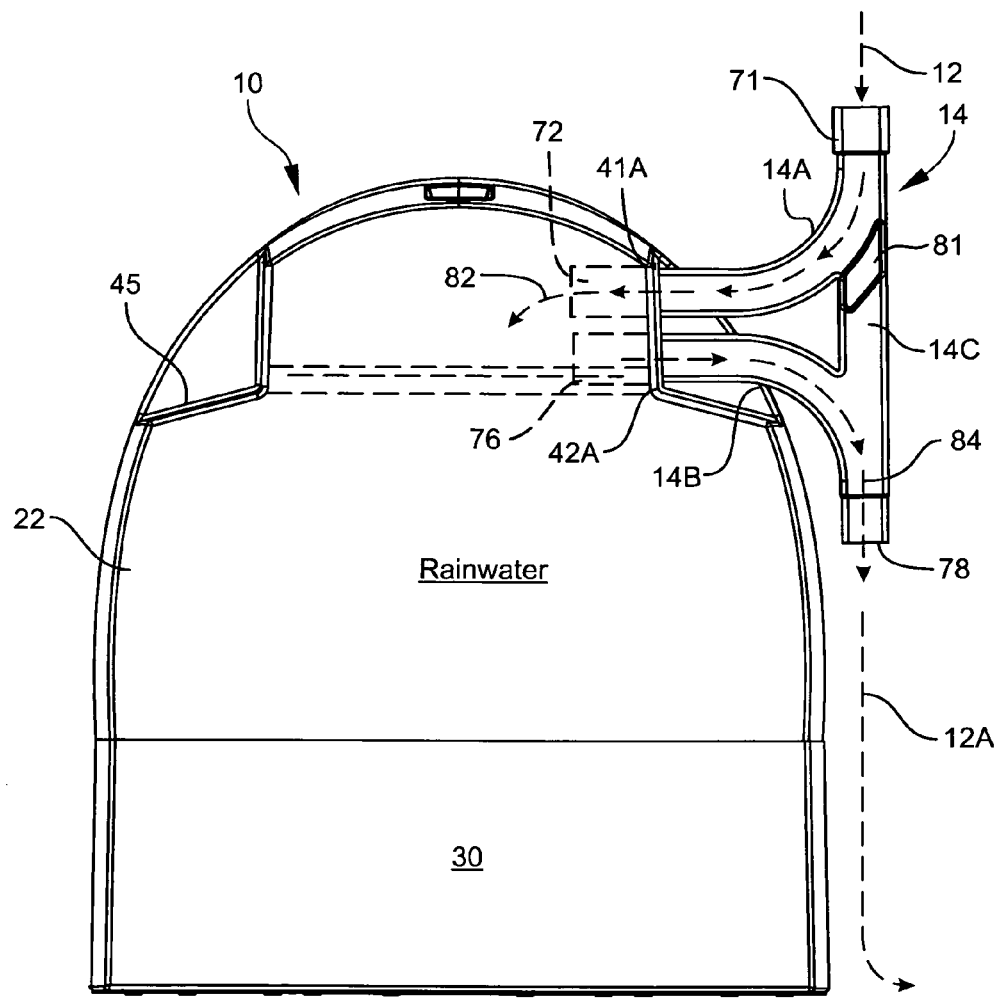
FIG. 10 a rear view of the rain barrel schematically demonstrating attachment and operation of the downspout diverter.

Referring to FIGS. 9 and 10, the inlet section 14A of the diverter 14 has a first open end 71 which connects to the existing downspout 12 (e.g., by friction fit or using small metal screws or other fasteners), and a second open end 72 connecting (directly or indirectly) to the rain barrel 10 through the top transfer opening 41A formed with the back 22. In one exemplary embodiment, a short hollow extension (not shown) may be used to bridge the connection between the diverter inlet section 14A and the rain barrel 10. The inlet section 14A is concavely curved from its first end 71 to its second end 72. The outlet section 14B of the exemplary diverter 14 has a first open end 76 connected (directly or indirectly) to the rain barrel 10 through the bottom transfer opening 42A formed with the back 22, and a second open end 78 which extends vertically downward towards the ground or other supporting surface. A second short hollow extension (not shown) may be used to bridge the connection between the diverter outlet section 14B and the rain barrel 10. The second end 78 of the outlet section 14B may be connected (e.g., by friction fit or using metal screws or other fasteners) to the additional length of downspout 12A matching the existing downspout 12. The outlet section 14B is convexly curved from its first open end 76 to its second open end 78. The elongated connector section 14C of the diverter 14 interconnects the inlet section 14A and the outlet section 14B, and extends substantially co-linear to the first open end 71 of the inlet section 14A and the open second end 78 of the outlet section 14B, and along generally the same vertical axis of the existing downspout 12. The connector section 14C is closed at its top to form a sloping solid bottom 81 of the inlet section 14A, such that rainwater flows from the downspout 12 and is gravity-fed through the sloping inlet section 14A into the rain barrel 10, as indicated by arrow 82, until a maximum capacity is reached. At that point, any additional rainwater collected is directed outwardly through the outlet section 14B of the diverter 14, as indicated by arrow 84.

In the above implementation, the unused bottom transfer opening 42B is covered and water sealed using a removable solid wall plug (not shown). The unused top transfer opening 41B may be removably covered using a mesh screen plug (not shown) or the like sufficient to allow air circulation inside the barrel 10, while preventing entry of flies, mosquitos, gnats, ants, and other small bugs and insects. It is understood that the exemplary rain water barrel 10 is designed to be utilized in combination with the downspout diverter 14 on either side (i.e., to the right or left) of an existing downspout 12.

Figure 11:
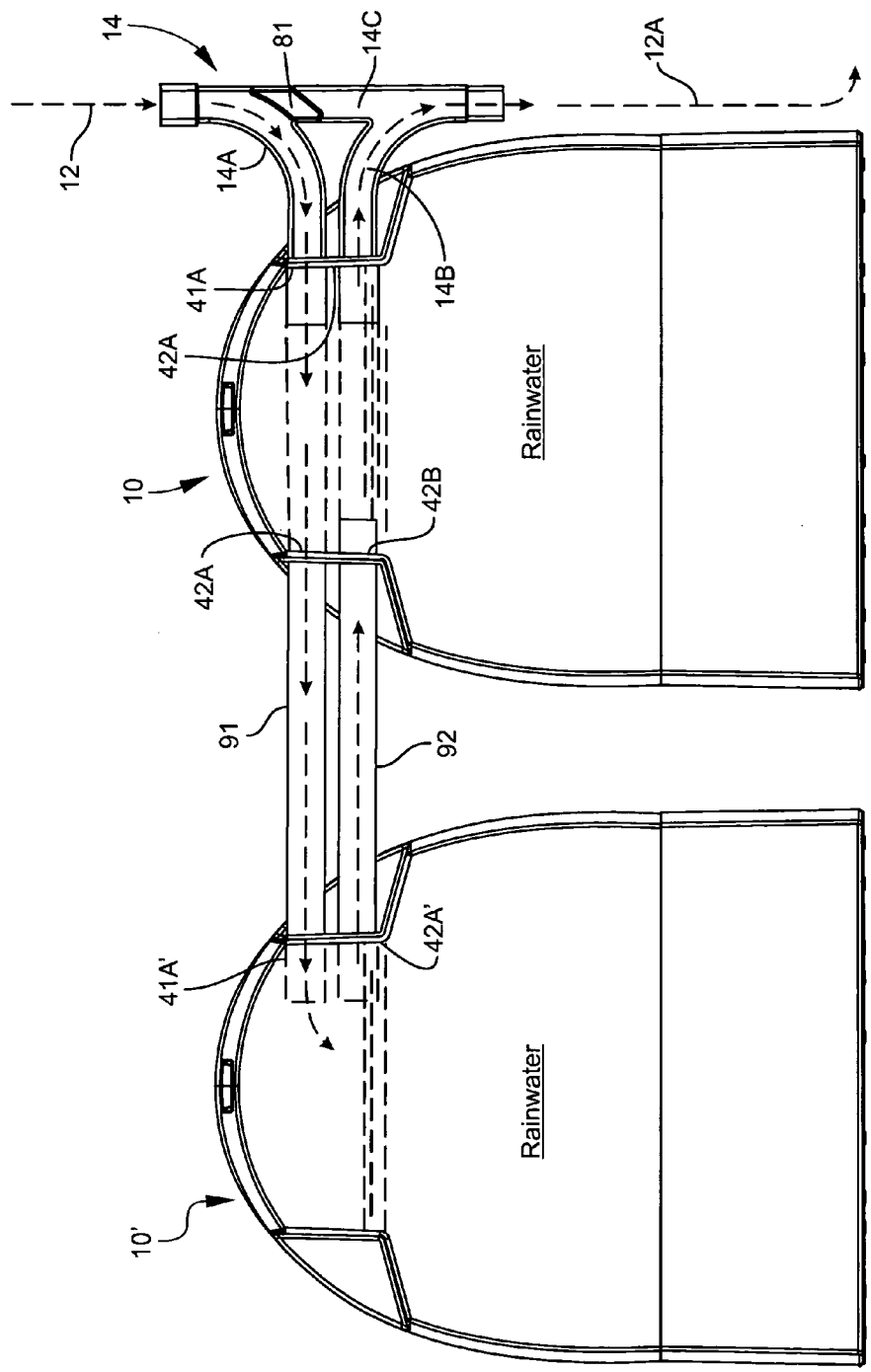
FIG. 11 a rear view of two rain barrels used in tandem, and schematically demonstrating attachment and operation of the downspout diverter and water transfer extensions.

FIG. 11 demonstrates use of the exemplary rain barrel 10 in tandem with a like barrel 10', the present downspout diverter 14, and cooperating hollow water transfer extensions 91 and 92. The downspout diverter 14 fluidly interconnects the existing vertical downspout 12 of the building, the rain barrel 10, and the optional downspout extension 12A, as previously described. The first barrel 10 is fluidly connected to the second barrel 10' by a long transfer extension 91 and a short transfer extension 92. The long extension 91 run substantially horizontally from the inlet section 14A of the diverter 14 through the first barrel 10 through top transfer openings 41A, 42A, and into the second barrel 10' through its top transfer opening 41A'. Rainwater collects in the second barrel 10' until reaching a maximum level. At that point, excess rainwater transfers from the second barrel 10' to the first barrel 10 via the short transfer extension 92 passed through respective bottom transfer openings 41B', 42B, and 41B of the barrels 10', 10. When the first barrel 10 reaches its maximum level, any additional rainwater is passed outwardly through the outlet section 14B of the diverter 14.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. A system for rainwater harvesting, comprising:
   a rain barrel adapted for collecting and storing rainwater runoff gravity-fed from a rooftop through a downspout;
   a downspout diverter comprising an inlet section, an outlet section, and an elongated connector section interconnecting said inlet section and said outlet section;
   said inlet section having a first open end adapted for communicating with an end of the downspout and a second open end communicating with an inlet opening formed with said rain barrel, and wherein the inlet section of said downspout diverter is concavely curved between its first open end and its second open end; and said outlet section having a first open end communicating with an outlet opening formed with said rain barrel and a second open end for directing rainwater outwardly from said rain barrel.

2. The system for rainwater harvesting according to claim 1, wherein said rain barrel comprises a rounded front and a back, said rounded front comprising an integrally-molded three-dimensional interior grid structure.

3. The system for rainwater harvesting according to claim 1, wherein said rain barrel comprises a rounded front and a back, said back comprising an integrally-molded three-dimensional interior grid structure.

4. The system for rainwater harvesting according to claim 1, and comprising a mounting base adapted for carrying said rain barrel, and elevating said rain barrel above a supporting surface.

5. The system for rainwater harvesting according to claim 1, wherein said rain barrel defines at least one substantially planar exterior surface extending from a bottom of said barrel to a top of said barrel.

6. The system for rainwater harvesting according to claim 1, wherein said rain barrel defines first and second mirrored inlet openings.

7. The system for rainwater harvesting according to claim 1, wherein said rain barrel defines first and second mirrored outlet openings.

8. The system for rainwater harvesting according to claim 1, and comprising a spigot connected to said rain barrel and adapted for enabling controlled dispensing of water contained in said rain barrel.

9. The system for rainwater harvesting according to claim 1, wherein the outlet section of said downspout diverter is convexly curved from its first open end to its second open end.

10. The system for rainwater harvesting according to claim 9, wherein the connector section of said downspout diverter extends substantially co-linear to the first open end of the inlet section and the second open end of the outlet section.

11. In combination with a rainwater downspout extending downwardly from a building rooftop, a system for rainwater harvesting comprising:

a rain barrel adapted for collecting and storing rainwater runoff gravity-fed from a rooftop through a downspout;

a downspout diverter comprising an inlet section, an outlet section, and an elongated connector section interconnecting said inlet section and said outlet section;

said inlet section having a first open end communicating with an end of the downspout and a second open end communicating with an inlet opening formed with said rain barrel, and wherein the inlet section of said downspout diverter is concavely curved between its first open end and its second open end; and said outlet section having a first open end communicating with an outlet opening formed with said rain barrel and a second open end for directing rainwater outwardly from said rain barrel.

12. The combination according to claim 11, wherein said rain barrel comprises a rounded front and a back, said rounded front comprising an integrally-molded three-dimensional interior grid structure.

13. The combination according to claim 11, wherein said rain barrel comprises a rounded front and a back, said back comprising an integrally-molded three-dimensional interior grid structure.

14. The combination according to claim 11, and comprising a mounting base adapted for carrying said rain barrel, and elevating said rain barrel above a supporting surface.

15. The combination according to claim 11, wherein the outlet section of said downspout diverter is convexly curved from its first open end to its second open end.

16. The combination according to claim 15, wherein the connector section of said downspout diverter extends substantially co-linear to the first open end of the inlet section and the second open end of the outlet section.

17. A downspout diverter adapted for use in combination with a rainwater downspout and a rain barrel, said downspout diverter comprising:

an inlet section having a first open end adapted for communicating with the downspout and a second open end adapted for communicating with the rain barrel, and wherein said inlet section is concavely curved from its first open end to its second open end;

an outlet section having a first open end adapted for communicating with the rain barrel and a second open end adapted for directing rainwater outwardly from said rain barrel, and wherein said outlet section is convexly curved from its first open end to its second open end; and an elongated connector section interconnecting said inlet section and said outlet section, and extending substantially co-linear to the first open end of said inlet section and the second open end of said outlet section.

18. The downspout diverter according to claim 17, wherein said inlet, outlet, and connector sections are integrally formed together as a single homogenous structure.

* * * * *